No. 868,119. PATENTED OCT. 15, 1907.
R. H. PASCALL.
GOVERNOR.
APPLICATION FILED MAR. 18, 1907.
2 SHEETS—SHEET 1.
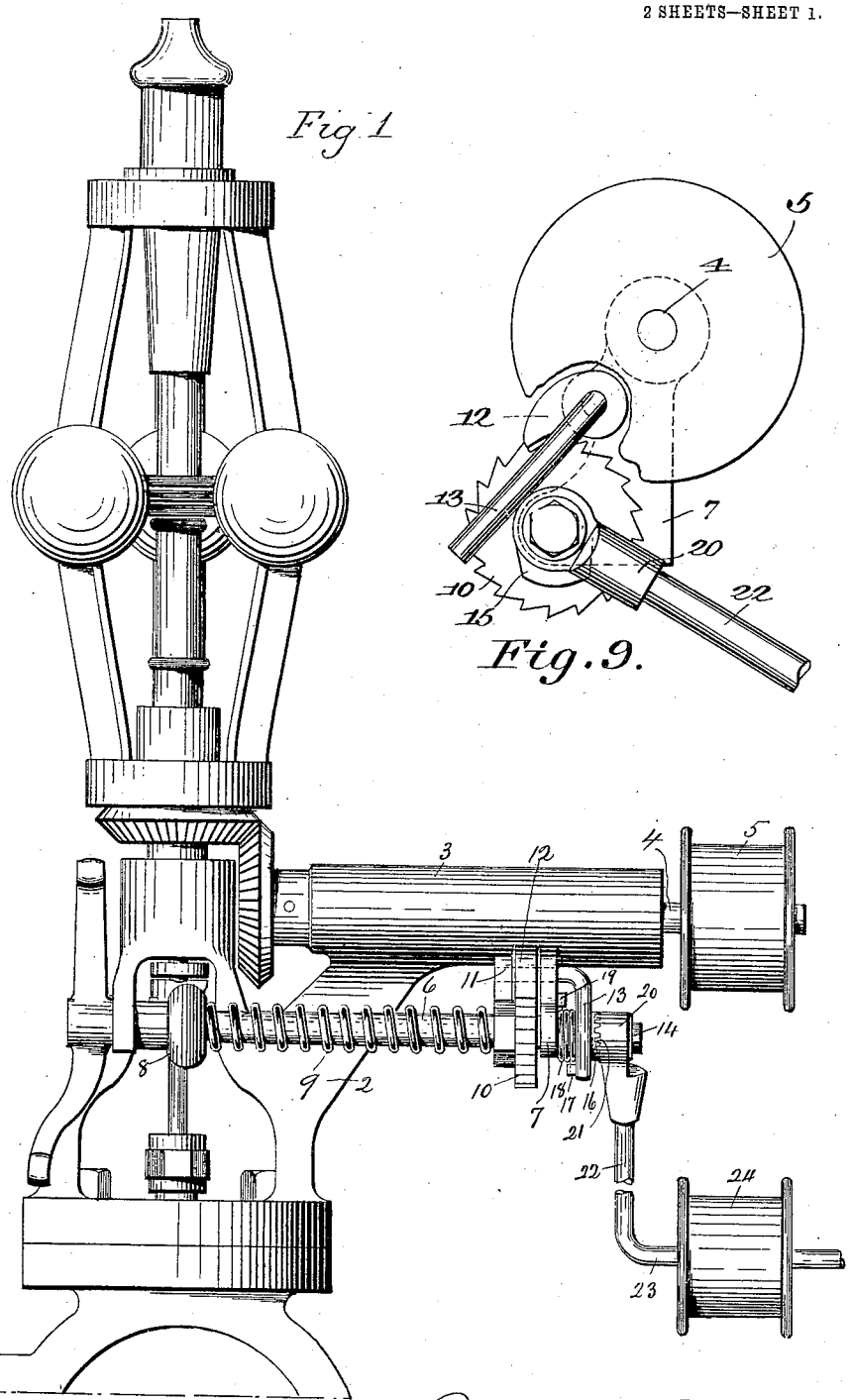

No. 868,119. PATENTED OCT. 15, 1907.
R. H. PASCALL.
GOVERNOR.
APPLICATION FILED MAR. 18, 1907.
2 SHEETS—SHEET 2.
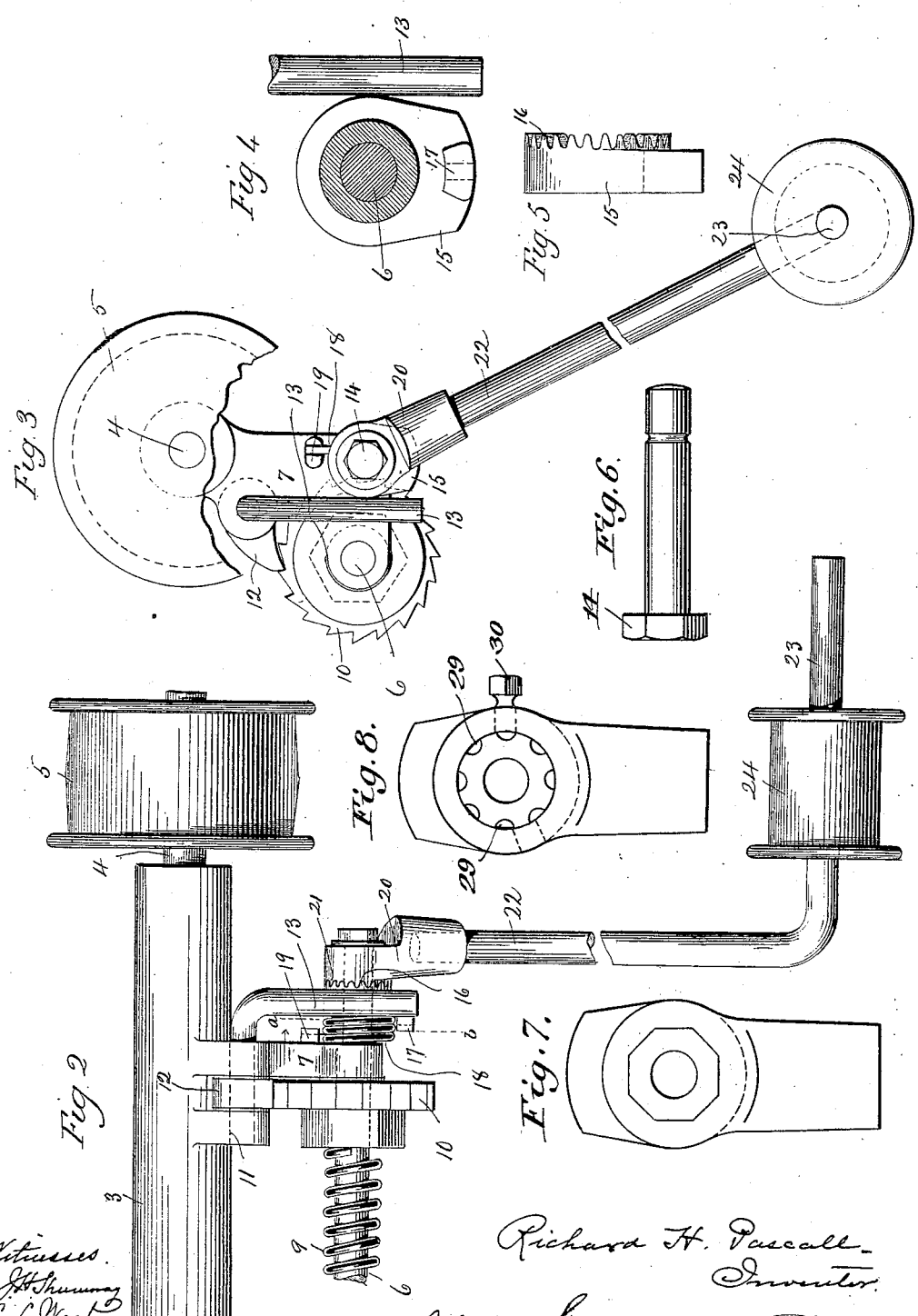

UNITED STATES PATENT OFFICE.

RICHARD H. PASCALL, OF PORTLAND, CONNECTICUT, ASSIGNOR TO THE PICKERING GOVERNOR CO., OF PORTLAND, CONNECTICUT, A CORPORATION.

GOVERNOR.

No. 868,119.  Specification of Letters Patent.  Patented Oct. 15, 1907.

Application filed March 18, 1907. Serial No. 362,926.

*To all whom it may concern:*

Be it known that I, RICHARD H. PASCALL, a citizen of the United States, residing at Portland, in the county of Middletown and State of Connecticut, have invented a new and useful Improvement in Engine-Governors; and I do hereby declare the following, when taken in connection with the accompanying drawings and the letters of reference marked thereon, to be a full, clear, and exact description of the same, which said drawings constitute part of this specification, and represent, in—

Figure 1 a side view of a governor showing my improved stop motion applied thereto. Fig. 2 a side view of the outer end of the driving shaft supporting bracket illustrating my improved stop motion on a larger scale. Fig. 3 an end view of the same with the driving belt pulley partially broken away. Fig. 4 a sectional view on the line *a—b* of Fig. 2. Fig. 5 a side view of the adjusting cam detached. Fig. 6 a side view of the stud on which the cam is mounted. Figs. 7 and 8 are end views illustrating modified means for connecting the socket and cam. Fig. 9 an end view illustrating the stop motion as mounted upon the speeder shaft.

This invention relates to an improvement in engine governors, and particularly to automatic stops therefor. In engine governors having automatic stops difficulty is sometimes experienced by reason of the derangement of parts due to the constant vibration to which they are subjected so that when called into use are not in proper position to act. Furthermore as the direction or inclination of the governor belt varies in different engines, means should be provided for positively locking the shaft which supports the idler pulley which rides upon the belt in the different positions required in different engines for the changes in the direction of the governor belt.

The object of this invention is to make more secure the tripping device in connection with the safety appliance for stopping the engine when the belt breaks or runs off the pulley, and to provide for a convenient and positive adjustment of the idler shaft and its connection with the tripping device; and the invention consists in the construction hereinafter described and particularly recited in the claims.

In illustrating my invention I have shown it as applied to the standard type of "Pickering" governor comprising a bracket 2 having a bearing-arm 3 in which the driving shaft 4 is mounted, having at its end a governor belt pulley 5. Below the driving shaft 4 and parallel therewith is a speeder shaft 6 supported at its outer end in an arm 7 depending from the bearing arm 3 and connected at its inner end with a speeder collar 8 controlled by a speeder spring 9, all substantially in the usual construction. Mounted on the speeder shaft 6 near its outer end is a ratchet wheel 10. Mounted in the arm 7 is a rock shaft 11 to which is keyed a pawl 12 adapted to engage with the ratchet 10, and this rock shaft is formed with a downwardly extending lever arm 13. Secured in the arm 7 is a stud 14 on which is mounted a cam 15 adapted to come in contact with the lever arm 13. The outer face of this cam 15 is preferably formed with a series of teeth 16 and may be provided at its rear with a lug 17 to receive one end of a spring 18 the other end of which is secured in a lug 19 on the outer face of the bracket arm 7. Mounted upon the stud 14 is a socket piece 20 provided with teeth 21 adapted to engage with the teeth 16 on the cam so as to be interlocked therewith thus effectually securing and maintaining the desired relative position of these two parts. In this socket-piece the idler shaft 22 is fixed, the shaft having an outwardly extending arm 23 on which an idler pulley 24 is arranged in the plane of the pulley 5 and so as to rest upon the governor belt. The relative position of this idler varies under different conditions and by providing the socket and the cams with interlocking teeth, the inclination of the idler arm may be conveniently and readily changed by simply withdrawing the stud 14 so as to disengage the teeth of the socket from the teeth on the cam when the socket can be turned to throw the idler shaft to the proper place, when the socket may again be engaged with the cam. With the idler thus arranged, if the belt breaks the idler drops and causes the cam 15 to turn the lever arm 13 so as to throw the pawl 12 out of engagement with the ratchet wheel 10, allowing the spring 9 to at once raise or lower the speeder collar to operate the governor valve and stop the engine. In a horizontal engine the idler arm would be arranged so nearly horizontal that when the belt breaks it would have considerable fall and the force of gravity would be sufficient to operate the cam; but in vertical engines where there would be but slight movement of the idler, the spring above described may be employed, this spring tending to throw the cam against the lever-arm so as to raise the pawl.

Instead of forming the cam and the socket with teeth for engagement with each other, the collar may be formed octagonal or of other irregular shape, and the socket correspondingly formed to set over it as shown in Fig. 7 so that the socket can be positively engaged with the cam at various angles. Or the collar 25 may be formed with a series of notches 29 to receive a screw stud 30 mounted in the socket so that the socket may be positively engaged with the collar at various points of adjustment, as shown in Fig. 8 of the drawings. Instead of mounting the cam upon a separate stud as before described, it may be mounted upon the outer end of the speeder shaft 6 as shown in Fig. 9 of the drawings, in which case the inclination of the lever arm 13 will be outward to clear the shaft, but still in position to be operated upon by the cam 15 when the socket is turned.

I claim:—

1. In a governor, the combination with the speeder shaft, of a ratchet wheel mounted thereon, a rock shaft, a pawl mounted thereon and engaging with said ratchet, said rock shaft formed with a lever arm, a cam mounted adjacent thereto, a socket piece interlocked with said cam, and an idler carried by said socket piece, substantially as described.

2. In a governor, the combination with the speeder shaft, of a ratchet wheel mounted thereon, a rock shaft, a pawl mounted thereon and engaging with said ratchet, said rock shaft formed with a lever arm, a cam mounted adjacent thereto, a socket piece adjustably engaged with said cam and positively interlocked therewith, and an idler carried by said socket piece, substantially as described.

3. In a governor, the combination with the speeder shaft, of a ratchet wheel mounted thereon, a rock shaft, a pawl mounted thereon and engaging with said ratchet, said rock shaft formed with a lever arm, a cam arranged adjacent thereto and having an irregular surface, a socket piece having a corresponding irregular surface to engage therewith, and an idler mounted in said socket piece, substantially as described.

4. In a governor, the combination with the speeder shaft, of a ratchet wheel mounted thereon, a rock shaft, a pawl mounted thereon and engaging with said ratchet, said rock shaft formed with a lever arm, a cam arranged adjacent thereto and having an irregular surface, said cam formed in its outer face with a series of outwardly projecting teeth, a socket piece having corresponding teeth to engage therewith, and an idler mounted in said socket piece, substantially as described.

5. In a governor, comprising a driving shaft bearing arm, a bracket arm depending therefrom, a speeder shaft, a ratchet wheel mounted thereon, a rock shaft mounted in said bracket arm and having a lever arm extending therefrom, a pawl on said shaft and engaging with said ratchet, a stud mounted in said bracket arm, a cam mounted on said stud and adapted to engage with said lever arm, a socket piece also mounted on said stud and adjustably but positively interlocked with said cam, and an idler pulley supported by said socket piece, substantially as described.

6. In a governor comprising a driving shaft bearing arm, a bracket arm depending therefrom, a speeder shaft, a ratchet wheel mounted thereon, a rock shaft mounted in said bracket arm and having a lever arm extending therefrom, a pawl on said shaft and engaging with said ratchet, a stud mounted in said bracket arm, a cam mounted on said stud and adapted to engage with said lever arm, a socket piece also mounted on said stud and adjustably connected with said cam, an idler pulley carried by said socket piece, and a spring arranged on said stud and connected with the cam and with the bracket, substantially as described.

In testimony whereof, I have signed this specification in the presence of two subscribing witnesses.

RICHD. H. PASCALL.

Witnesses:
GEO. C. PASCALL,
EMANUEL OSTERGREN.